3 Sheets--Sheet 1

B. HERSHEY.
Machine for Welding Chain Links.

No. 166,373. Patented Aug. 3, 1875.

Attest:
Edwin James
John K. Jones

Inventor,
Benjamin Hershey.
per J. E. H. Holmead
Attorney.

3 Sheets--Sheet 2.

B. HERSHEY.
Machine for Welding Chain Links.

No. 166,373.        Patented Aug. 3, 1875.

Attest;
Edwin James.
John K. Jones

Inventor;
Benjamin Hershey.
per J. E. J. Holmead,
Attorney.

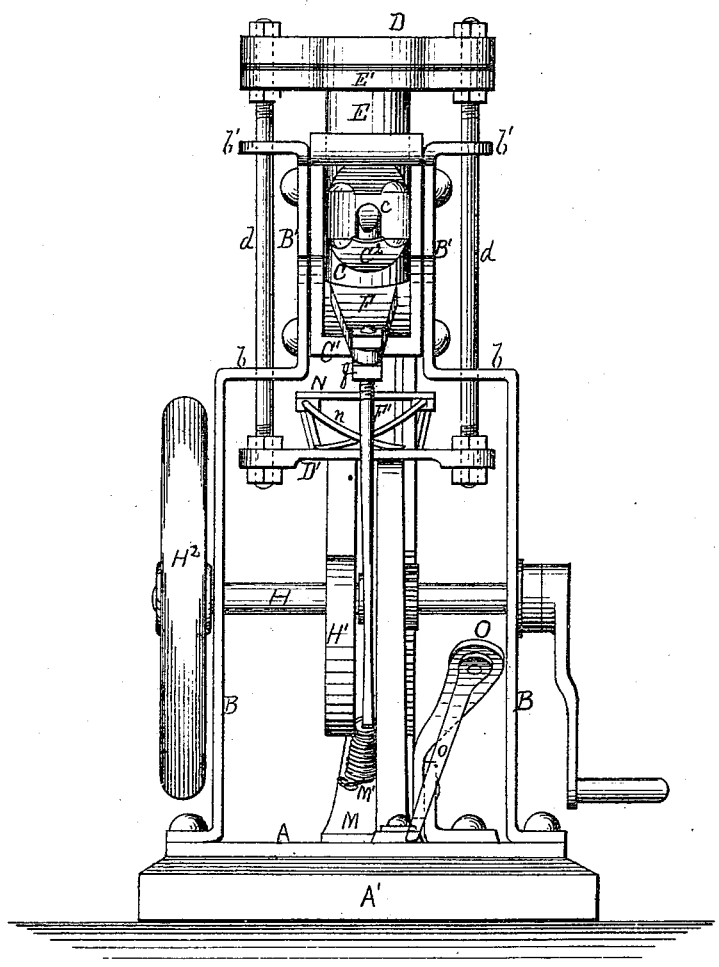

UNITED STATES PATENT OFFICE.

BENJAMIN HERSHEY, OF ERIE, PENNSYLVANIA, ASSIGNOR TO PITTSBURGH CHAIN AND CAR-LINK MANUFACTURING COMPANY.

IMPROVEMENT IN MACHINES FOR WELDING CHAIN-LINKS.

Specification forming part of Letters Patent No. 166,373, dated August 3, 1875; application filed March 12, 1875.

CASE A.

*To all whom it may concern:*

Be it known that I, BENJAMIN HERSHEY, of the city and county of Erie, and State of Pennsylvania, have invented certain Improvements in Chain-Link-Welding Machines, of which the following is a full, clear, and exact description, reference being had to the accompanying drawing, and the letters of reference marked thereon, making part of this specification, in which—

Figure 1:
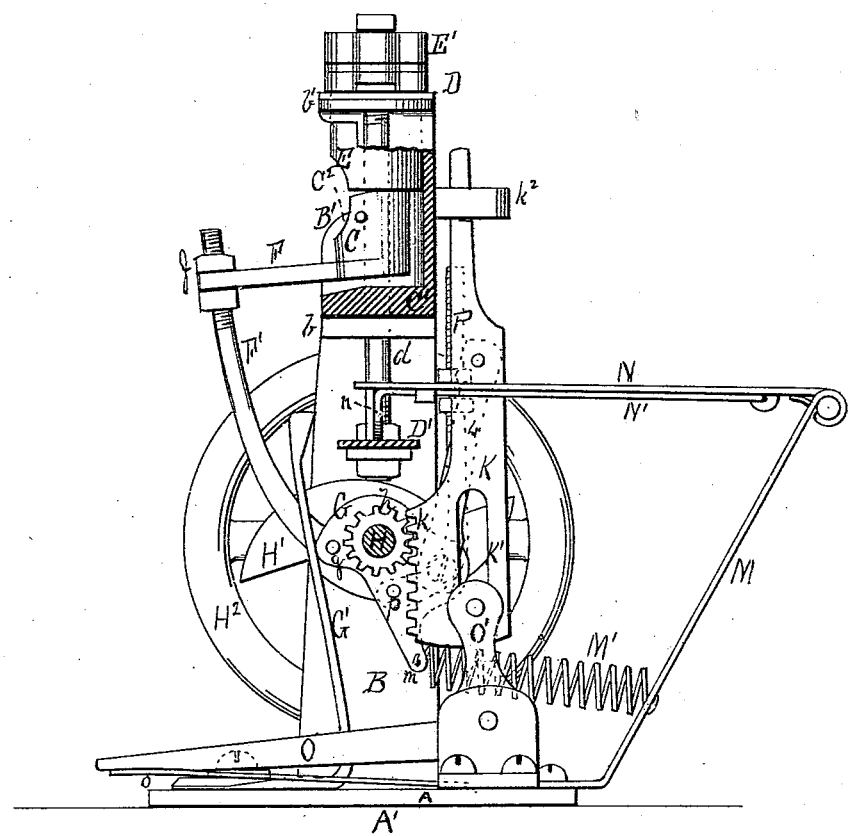
Figure 2:
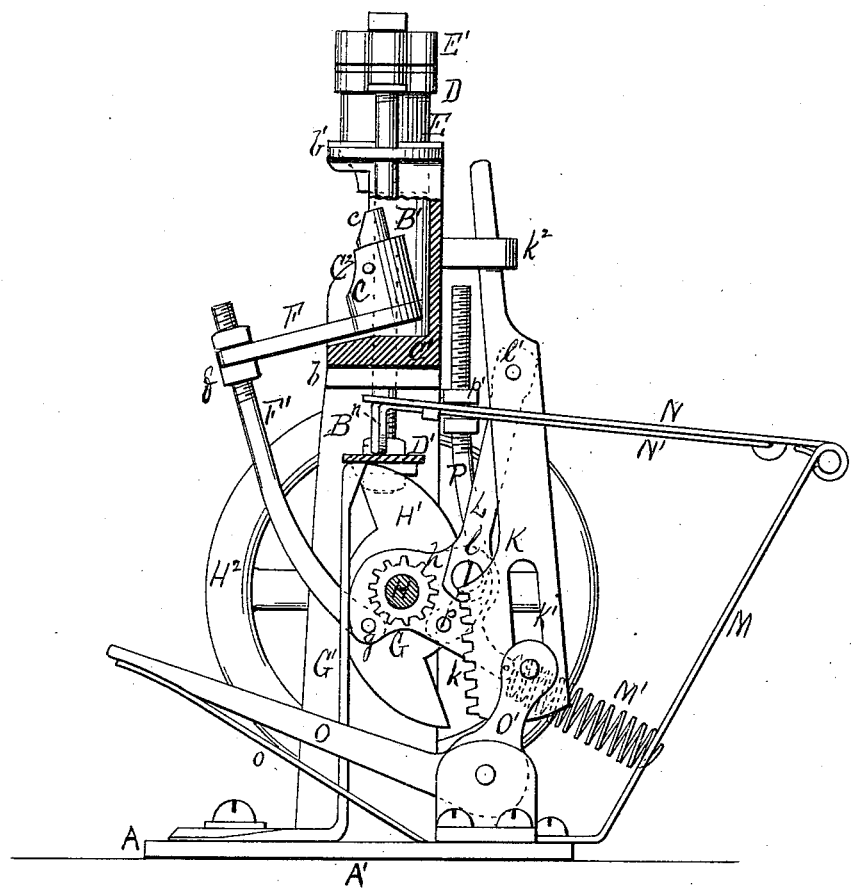

Figures 1 and 2 are vertical sectional views, showing the various features of the mechanism in different positions. Fig. 3 is a front view.

My present invention is an improvement on the invention embraced in and covered by Letters Patent of the United States issued to me May 20, 1873, No. 139,151.

The nature of my invention consists in forming the inferior or lower die with a permanent tongue, and in so securing the same in its sleeve-bearing as to permit of its having a forward rocking or tilting movement, the tongue retaining and securing the link for the direct action of the dies during the process of welding, and the tilting forward of the die, after the process of welding is completed, freeing the welded link from all its bearings within the sleeve in which the dies work, and thus permitting of its ready removal. My invention also consists in securing the traveling die in a suitable gate or frame, which, in connection with its bearings in the sleeve in which the rocking die is secured, insures the most positive and direct action of the dies during their operation. My invention also consists in the different combinations of mechanism, and which includes a motor-cam, bell-crank lever, ratchet-arm, pinion, and treadle, and their connections, and which are hereinafter fully described, whereby, through the action of the bell-crank lever, the lower die is automatically tilted forward and returned, the stop-lever is released, causing the gate carrying the traveling die to fall, so as to be operated by the motor-cam, and which controls the action of the spring, causing its power to be accumulated by the upward movement of the gate carrying the traveling die, so as to be exerted with its full force on its return or downward movement, and thus adding force to the blow of the hammer-die.

The construction and operation of my invention are as follows: A is the bed-piece or base of the machine, and is securely bolted or otherwise secured to a platform or other suitable support, A'. On this bed-piece A are seated two vertical upright bearing-plates, B B. In the drawings one of these plates is removed, the more clearly to show the operating mechanism of the machine. The upper section of these uprights are bent, so as to provide horizontal bearings $b\ b$ for the lower section of the plunger frame or gate D, and vertical bearings B' B' at their upper sections for the stationary die-box C. The edges of the sections B' B' of the uprights are bent over at right angles, and provide bearings $b'\ b'$ for the upper section of the plunger frame or gate D to work in. In the sections B' B' of the uprights B B is secured the sleeve or die-box $C^1$, and in which is journaled, so as to rock or tilt on its pivot or axial centers, the lower die C, and in which sleeve also works the movable or traveling die E.

D is an open plunger frame or gate, that carries the traveling or hammer die E. This frame or gate consists of parallel guide-rods $d\ d$, which work through the right-angled and flanged bearings $b\ b$ and $b'\ b'$ of the uprights B B. These rods are connected at their lower section by a base-plate, D', and at their upper section by a cross-plate, E', and to which is secured the traveling die E, as clearly shown on each of the sheets of the accompanying drawing. The cavities of the rocker-die C and traveling die E are circular grooves or concave recesses, or are die-faces of a form and dimensions suited to the links which are to be welded, and are designed to weld the link in precisely the same manner as described in my former patent, the plunger-frame which carries the traveling die being elevated by a cam, and the force of its blow augmented or increased through the tension of a spring precisely as the plunger-rod and die are operated in said patent. In my Patent No. 139,151 the lower or inferior die was not solid, as in my present improvement, but had a vertical opening through its center, which permitted of a tongue being driven up through the die to secure and steady the link for the action of the dies during the process of welding, and at the same time permitted of the tongue being readily withdrawn when the operation was complete, and which so freed the link of all retaining bearings as to allow of its being readily removed. The movable tongue in my present improvement is dispensed with, and the release of the link is effected by having the lower or inferior die so secured in its bearings as to permit of its being rocked or tilted forward so soon as the proper welding of the link is effected. The front face of this die is cut away, as shown at $C^2$, and the front of the die-box is open, so as to insure the instantaneous release or dropping of the link, while the tongue or projection $c$, which is cast or otherwise permanently secured at the center of the die C, offers all the advantages of the movable tongue of my former patent, as it serves as a bearing to steady the link for the proper and direct action of the dies, while the tilting of the die, in the most expeditious manner, frees the link from all its bearings within the sleeve. This tongue or projection $c$, when the dies are brought together, as they are in striking the welding blow, and as shown in Fig. 1, enters a recess in the traveling die E, and which permits the cavities in the faces of the dies C E so to meet as to encircle or inclose the entire section of the link which is to be welded. To this rocking die C is secured a lever-plate, F, and which, through an adjusting-lever, F′, is connected with the plate G, and which arrangement causes the rocking die C to be automatically thrown forward at the proper time to release the welded link. The lever F′, which operates the die C, is, at its upper section, provided with a screw-thread, and which, in connection with the jam-nuts $ff$, permits of its relative bearing in connection with the lever-plate F being adjusted at pleasure. This lever F′ is pivoted to the bell-crank lever G at its cam projection or toe $g$, and which projection, besides serving as a bearing for the lever F′, at the proper time operates or releases the vertical trip-spring G′. This bell-crank-lever plate G is secured so as to fit loosely on the main driving-shaft H, and to which shaft is so keyed as to insure of its revolution with said shaft a ratchet-pinion, $h$, and which pinion $h$, in connection with the ratchet-arm K and connecting-plate L, operates the bell-crank lever G, and through it, in connection with the motor-cam, the entire operating mechanism of the machine. This connecting-plate L is pivoted to the bell-crank lever G at its cam toe or projection $l$, as clearly shown in Fig. 2, and is pivoted to the ratchet-arm K, as shown at $l'$. This arm K is connected, by means of a slotted bearing, K′, with the lever O′, and which is secured to the treadle O, and by which means, simply through depressing the treadle, the ratchet-face $k$ of the arm K is brought into gear with the ratchet-pinion $h$, and which elevates the arm K, causing it to draw up the lever L, so as to operate the bell-crank lever G. This ratchet-arm K is secured in a loose bearing, $k^2$, at the rear of the machine.

$o$ is a spring under the treadle O, and which is so arranged that its tension is constantly employed to elevate the treadle, and consequently to disengage from the gear with the pinion $h$ the ratchet-arm K, as is clearly shown in Fig. 2. At the rear of the machine, and securely bolted to the bed-piece A, is an inclined bearing-plate M, and to which is secured a coil or other spring, M′. This spring is attached at its opposite end to the arm or prong $m$ of the bell-crank lever G. This spring M′, so soon as the ratchet K is disengaged from the pinion $h$, returns or draws back the bell-crank lever G from the position shown in Fig. 1 to that shown in Fig. 2, and which leaves the vertical trip-spring G′ free to spring forward, and in such position as to pass under the bed D′ and receive and retain the plunger frame or gate D until said lever is again pushed out by the projection or toe $g$ on the bell-crank lever G. This trip G′ is constructed of any suitable metal having the required elasticity, and its form and arrangement are clearly shown in the drawing, and its function is precisely similar to that of the horizontal stop-bar described and claimed in my patent hereinbefore referred to. To this inclined bearing M is hinged the bed-plate N of the torsion-spring N, the lateral lever-arms $n\ n$ of which rest on the face D′ of the plunger frame or gate D. As this frame is elevated by the cam $H^1$ these lever-arms $n\ n$ are so pressed on as to twist or wrench the spring-rods, thus accumulating the power of the spring to add force to the downward plunge of the frame. The action of this spring N′ is controlled, or the degree of its tension is regulated, by means of a bent arm, P, which is bolted or pivoted in an eye, $p$, on the bell-crank lever G. The screw-threaded head of this arm passes through an opening in the plate N, as clearly shown in Fig. 2, and is secured by means of jam-nuts $p'\ p'$, and which permits of its being adjusted, so as to increase or diminish at pleasure the degree of its pressure on the plate, and causing the spring to act with greater or less power, as occasion requires. Thus it will be seen this bell-crank lever G, through its connection by means of the plate L with the arm K, not only operates the rocking die through the action of the lever F′, but also brings into action each and every feature of the operating mechanism except the traveling or hammer die, and which is operated by the cam $H^1$. $H^1$ is an ordinary cam that operates the plunger-frame D, and $H^2$ is a driving-wheel, through which power is communicated to the shaft H and the entire operating mechanism.

What I claim as new, and desire to secure by Letters Patent of the United States, is—

1. The die E, having an opening to receive the permanent tongue or frog of the lower die C, in combination with said die C, provided with the permanent tongue, and mounted in the sleeve $C^1$ on a horizontal axis, to admit of its being tilted forward, substantially as and for the purposes set forth.

2. The combination of the rocking die C, plate F, adjusting-arm F′, bell-crank lever G, pinion $h$, ratchet-arm K, and link L, the whole being constructed as shown, whereby, through the action of the treadle, they are thrown into gear, so as to tilt the die forward to aid in releasing the finished link, substantially as described.

3. The combination of the rocking die C, plate F, adjusting-arm F′, bell-crank lever G, pinion $h$, arm K, link L, and spring M′, the whole being constructed and arranged as shown, whereby, when the ratchet-arm is disengaged, the die, which had previously been tilted forward, shall be automatically returned, substantially as described.

4. The combination of the spring stop-bar G′, bell-crank lever G, and its operating mechanism, cam $H^1$, and gate D, the whole being constructed and arranged as shown, whereby the traveling die is operated and retained, substantially as described.

5. The combination of the spring-bed N and spring N′, gate D, link L, arm P, and bell-crank lever G, and its operating mechanism, the whole being constructed and arranged to operate substantially as described.

In testimony whereof I have signed my name to this specification in the presence of two subscribing witnesses.

B. HERSHEY.

Witnesses:
   JOS. T. K. PLANT,
   EDWIN JAMES.